F. G. HUNT.
DISK HARROW.
APPLICATION FILED NOV. 21, 1911.

1,041,797.

Patented Oct. 22, 1912.

2 SHEETS—SHEET 1.

Witnesses

Inventor
F. G. Hunt

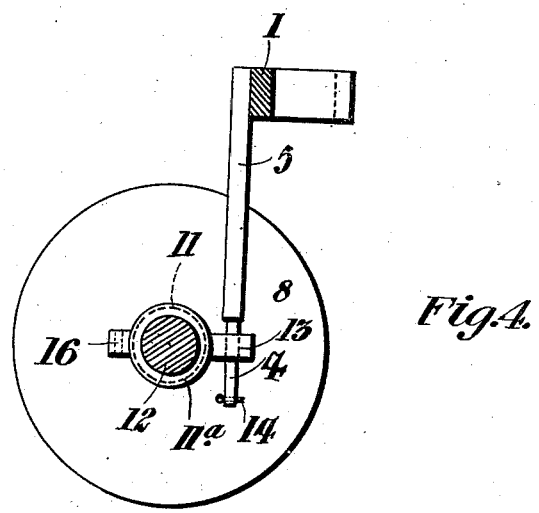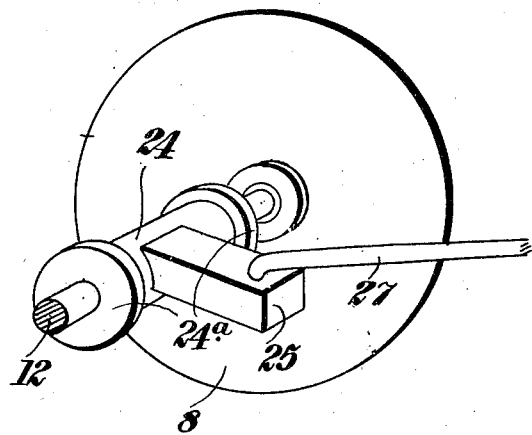

UNITED STATES PATENT OFFICE.

FREDERICK GEORGE HUNT, OF ELORA, ONTARIO, CANADA.

DISK HARROW.

1,041,797.  Specification of Letters Patent.  Patented Oct. 22, 1912.

Application filed November 21, 1911. Serial No. 661,468.

*To all whom it may concern:*

Be it known that I, FREDERICK GEORGE HUNT, of the town of Elora, in the county of Wellington, in the Province of Ontario, Canada, have invented certain new and useful Improvements in Disk Harrows, of which the following is the specification.

My invention relates to improvements in disk harrows and the object of the invention is to devise a frame joining uprights or connections placed on parallel lines at right angles with the line of draft, the said uprights or connections being placed at suitable locations on these parallel lines, and in which the independent pairs of gangs secured thereto will be staggered in relation to each other when in an inoperative position and wherein the pair on each side of the frame will come into alinement when in an operative position. The gangs do better work and are less liable to become clogged in this form.

A further object is to devise means for swinging the gangs into an inoperative position wherein the disks are parallel to the line of draft, or into an operative position wherein the disks are at an angle to the line of draft.

A still further object is to devise a connection between the gang and the frame which will permit of the gang moving vertically relatively to the frame so as not to cut too deep when traversing lumps or uneven ground.

The invention consists of a staggered frame joining uprights or connections placed on parallel lines at right angles with the line of draft, the said uprights or connections having suitable tongues at the bottom thereof formed at the outer ends of the staggered portions of the frame, similar uprights suitably connected to the rear bar of the frame, independent gangs of disks suitably connected to the said uprights, and levers for swinging the gangs of disks into an operative or inoperative position all as hereinafter more particularly described and illustrated in the accompanying drawings in which:—

Figure 1:
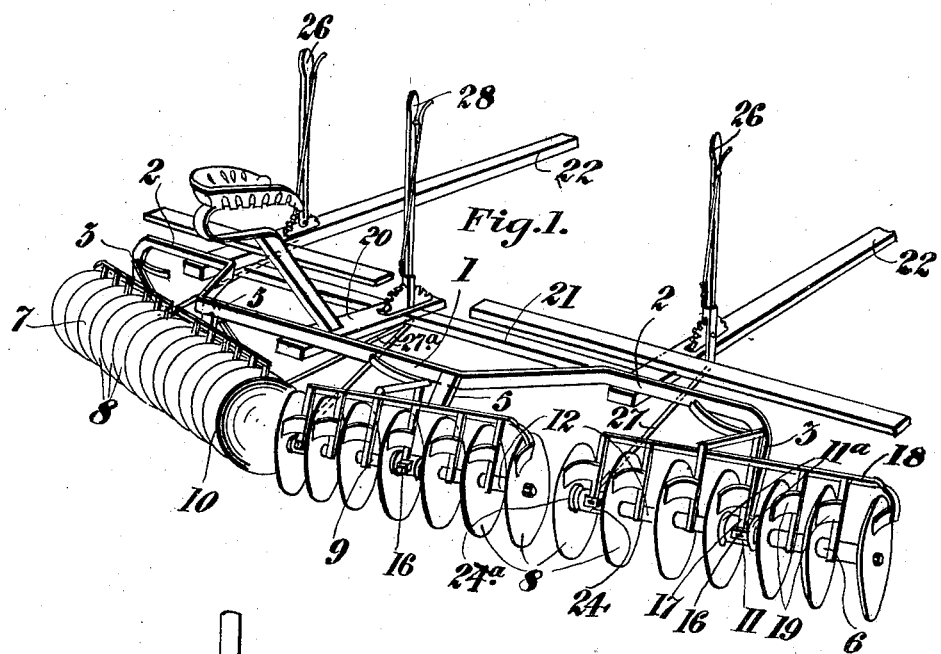
Figure 2:
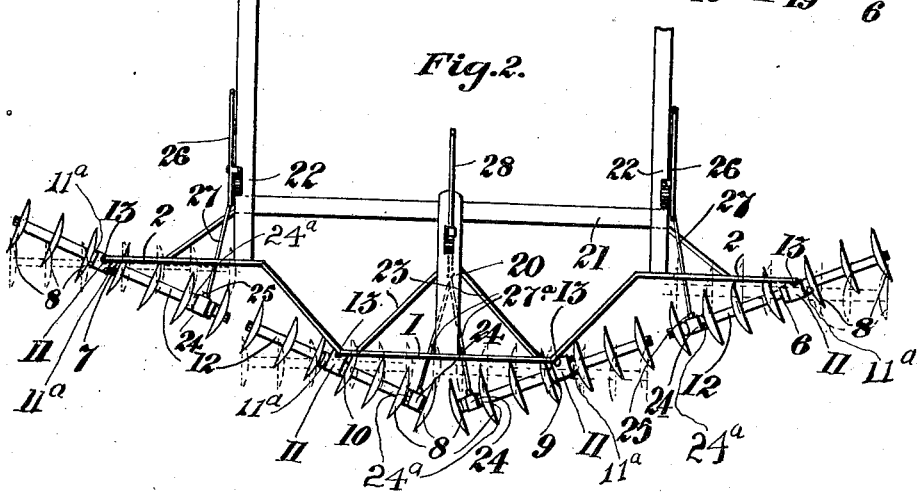
Figure 3:
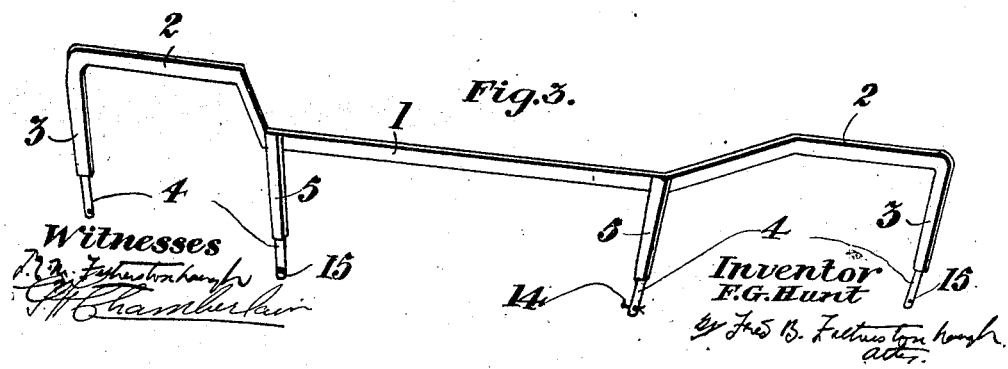

Figure 1, represents a perspective view of the device constructed according to my invention. Fig. 2, is a plan view thereof. Fig. 3, is a perspective detail of the frame. Fig. 4, is a detail showing the method of connecting the gangs of disks to the upright. Fig. 5, is a perspective view of the sleeves connecting the levers on the frame with the gangs of disks.

Like letters of reference indicate corresponding parts in each figure.

1 is the rear portion of the frame and 2 are the staggered portions with downwardly and inwardly inclined ends 3 having tongues 4 formed at the bottom thereof.

5 are inwardly inclining uprights secured to the rear portion 1 of the frame and having tongues 4 formed at the bottoms thereof.

6 and 7 are the outer gangs having disks, and 9 and 10 are the gangs with disks 8.

11 are sleeves mounted on the axles 12 of the respective gangs and between collars 11$^a$ secured to the axles. In the present instance the gangs are each composed of seven disks 8 connected to each axle 12. The sleeves 11 are preferably mounted in this case between the third and fourth disk from the outer end in each gang.

13 are sockets formed on the front of the sleeves 11 and designed to have the tongue 4 of the uprights 3 and 5 inserted therein, the tongues being of substantially greater depth than the depth of the sockets.

14 are cotter pins inserted in apertures 15 in the tongues 4 to prevent the latter from slipping out of the sockets.

16 are sockets formed on the rear of the sleeves 11 and designed to have uprights 17 inserted therein which hold the scraper bars 18 and the scrapers 19 in place.

20 is a longitudinal beam rigidly secured to and extending from the portion 1 of the frame to a cross bar 21 which extends between the poles 22. These poles 22 are rigidly secured at their rear ends to the portions 2 of the frame.

23 are braces extending from the rear portion of the frame 1 to the beam 20.

24 are sleeves mounted on the axles 12 of the gangs between collars 24$^a$ and having the sockets 25 formed on the front of the said sleeves.

26 are the levers for actuating the outside gangs 6 and 7 through the rods 27 connected from the bottom of the levers to the socket 25. Independent levers actuate each of the outside gangs 6 and 7 while a single lever 28 moves the inside gangs 9 and 10 through the medium of the rods 27$^a$ connected thereto and to the sockets 25 of the sleeves 24.

From the above description it will be seen that by moving the levers 26 and 28 forward the gangs will swing into an operative position with the disks at an angle to the line of draft, both right and left hand pairs of gangs inclining inward, and by moving the levers backward the gangs will swing into an inoperative position with the disks parallel to the line of draft (as shown by the dotted lines in Fig. 2), the two rear gangs 9 and 10 being in the same line and the two front gangs 6 and 7 being in the same line but staggered in relation to the rear gangs. Further the tongues 4 being considerably longer than the depth of the sockets 13 the gangs will be allowed a certain amount of vertical play, and in this manner the cut made by the disks will be even when going over depressions or lumps in the ground. If for instance the gang 9 runs over a lump or crowning land it would allow the gang 6 to slip down on tongue 4, without raising gang 6 in the air and prevent it cutting, as would otherwise occur, or vice versa.

It will be seen that a harrow constructed according to my invention will possess many advantages. The gangs can be operated independently and further each gang will automatically compensate for uneven ground and the gangs being constructed separately will be more readily and easily moved in either an operative or inoperative position.

Many modifications may be made in the invention without departing from the spirit of the same or the scope of the claims and the form shown is to be taken in an illustrative and not in a limiting sense. For instance although the harrow shown in the drawing is outthrowing, by reversing the frame an inthrowing harrow can be constructed quite as efficiently. Further I do not wish to confine myself to the form of frame shown as any frame joining uprights or connections placed on parallel lines at right angles to the line of draft may be used with efficiency.

What I claim as my invention is—

1. A disk harrow comprising a frame having end portions in alinement with each other and an offset central portion paralleling said end portions, depending portions attached to the extremities of said end portions and from opposite ends of said central portion, a central pair of gangs and an outer pair of gangs, the gangs of each pair being independently connected to one of said depending portions, and means for simultaneously swinging one gang of each pair into alinement with the next adjacent gang and at an angle to the line of draft.

2. A disk harrow comprising a frame having end portions in alinement with each other and an offset central portion paralleling said end portions, a plurality of pairs of gangs connected to said frame and means for independently swinging the gangs of each pair into operative and inoperative position.

3. A disk harrow comprising a frame having end portions in alinement with each other and an offset central portion paralleling said end portions, a plurality of pairs of gangs connected to said frame, and means for simultaneously swinging one gang of each pair into alinement with the next adjacent gang and at an angle to the line of draft.

4. A disk harrow comprising a frame having end portions in alinement with each other and an offset central portion paralleling said end portions, said end portions having integral downwardly and inwardly inclined members, inwardly inclined uprights connected to the extremities of said offset central portion, a gang pivoted to each of said integral inclined members and said inclined uprights, and means for simultaneously swinging one of said gangs into operative position and into alinement with the next adjacent gang.

FREDERICK GEORGE HUNT.

Witnesses:
CHAS. E. BRECKENRIDGE,
P. N. WAIND.